United States Patent Office 2,762,680
Patented Sept. 11, 1956

2,762,680

PRODUCTION OF INHIBITOR GEL COMPOSITIONS

Clarence E. Hieserman, Cumberland, Md., assignor to Celanese Corporation of America, New York, N. Y., a corporation of Delaware No Drawing. Application October 2, 1952,
Serial No. 312,846

13 Claims. (Cl. 8—61)

This invention relates to the production of organic compounds and relates more particularly to an improved process for the production of a gelled dispersion of 1,3-diphenylimidazolidine and to the product of such process.

In the coloration of textile materials it is very desirable that the colors produced on the materials be as fast as possible to light, washing, and to other agencies such as acid fumes. On organic derivative of cellulose or polyester textile materials many dyestuffs yield desirable colors which are fast to washing but which change shade when exposed to acid fumes, such as, for example, the products of combustion of coal, gas, etc. This change in shade, usually referred to as "acid fading," may be a dulling of the brightness or a definite change in color. Acid fading is frequently observed in the case of blue anthraquinone colors on organic derivative of cellulose or polyester materials. When fabrics dyed with these colors are exposed to acid fumes the colors change from a pure blue shade to one having a reddish cast. On continued exposure to the acid fumes the blue color may even change to pink. The resistance of the dyed textile material to acid fading may be improved, to a large extent, by the incorporation of acid-fading inhibitors.

One very effective acid-fading inhibitor is 1,3-diphenylimidazolidine produced by the reaction of formaldehyde and N,N'-diphenyl ethylene diamine. Prior processes, for the production of this material have required the use of organic solvents or the fine emulsification of the diamine in aqueous medium. Both of these procedures are relatively expensive. For example, since the reaction is usually conducted at temperatures above the boiling point of the organic solvent, explosion-proof equipment is required. The solvent method also requires a solvent recovery system in order to make the reaction economically feasible. The aqueous emulsion method requires expensive emulsifying equipment and procedures and generally requires isolation steps, such as filtration and drying, to provide the inhibitor in marketable form.

It is therefore an object of this invention to provide a much cheaper and more efficient method for the production of acid-fading inhibitors, more particularly 1,3-diphenylimidazolidine.

Another object of this invention is the preparation of a novel and improved acid-inhibitor composition and a new method for using this composition.

Still another object of this invention is the provision of a new and improved method for the production of equeous dispersions of water-insoluble organic compounds.

Other objects of this invention will appear from the following detailed description.

According to my improved process the reactants to form the inhibitor, specifically an aldehyde and an N, N'-mono-substituted polymethylenediamine, are agitated at a reaction temperature with water containing a dispersing agent. The reaction produces a suspension of the water-insoluble inhibitor which may then be broken down to a finer particle size. Following this, the dispersing agent is caused to gel to produce a stable paste, which does not settle and can be stored for long periods of time. This paste may be sold as such and added directly to a dye bath or padding bath as desired.

While the preferred inhibitor is 1,3-diphenylimidazolidine, produced by the reaction of N, N'-diphenylethylene diamine and formaldehyde, this invention is also applicable to the preparation of other inhibitors such as any of the diazacyclo compounds having the formula

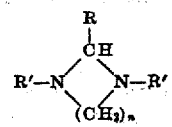

where R is a hydrogen, an alkyl, aryl, or substituted aryl group and R' a cycloalkyl, alkaryl, aryl or substituted aryl group and n an integer of at least 2. These compounds are produced by the reaction of an N, N'-monosubstituted polymethylene diamine with an aldehyde. The R' groups in the above formula may be the same or different substituents. More particularly R may be an alkyl group, such as a methyl, ethyl, propyl, butyl, isobutyl, or amyl group, or an aryl group, such as a phenyl or tolyl group, while R' may be a cycloalkyl group such as cyclohexyl, or a benzyl, phenyl, tolyl, ethyl phenyl, chlorphenyl, anisyl, phenetyl or acetanilido group, for example.

As examples of water-insoluble N, N'-mono-substituted polymethylene diamines which may be employed in the preparation of the inhibitor may be mentioned diphenyl ethylene diamine, dibenzyl ethylene diamine, dicyclohexyl ethylene diamine, ditolyl propylene diamine, diphenyl trimethylene diamine, diphenyl tetramethylene diamine and diphenyl pentamethylene diamine. Suitable aldehydes are, for example, formaldehyde, acetaldehyde, propionaldehyde, butyraldehyde, valeraldehyde, benzaldehyde, tolualdehyde, aldol, etc.

Best results have been obtained through the use of sodium lignosulfonate as the dispersing agent, but other water-soluble organic dispersing agents such as other lignosulfonate salts, particularly the alkali metal and ammonium salts, or lignosulfonic acid itself, may also be employed.

The reaction temperature may be varied widely, but if the diamine reactant is normally a solid, the temperature of the aqueous reaction medium is preferably high enough to melt the diamine. Optimum results have been obtained at temperatures of about 70 to about 80° C.

In carrying out this invention no emulsification of the reactants to a fine particle size is necessary. It is sufficient merely to mix the reactants thoroughly. In fact, only a portion, e. g. 20 to 50%, of the dispersing agent need be present during the reaction and the remainder may be added later, before gelation is effected.

In the preferred embodiment of my invention, I employ an excess of formaldehyde over the equimolar amount which is necessary to produce the desired 1,3-diazacyclo compound, the formaldehyde being added gradually to the agitated mixture of the water, lignosulfonate and diamine. After completion of the reaction the excess formaldehyde is decomposed, as by adding excess caustic soda to the reaction mixture and heating until the odor of formaldehyde disappears, following which the excess caustic soda may be neutralized.

The product resulting from the reaction is generally in the form of a granular suspension. In order to reduce the particle size this suspension is subjected to a ball milling treatment until the material no longer has a gritty feel. While ball-milling is preferred, other methods of comminuting or reducing the particle size may be employed, such as the use of a wet grinder, an attrition mill, or a colloid mill. The treatment is continued until the particle size has been reduced, preferably to below about 20 microns, most desirably in the range of 5 to 10 microns.

In the preferred method, the smooth suspension is caused to gel by the addition of sodium chloride, while agitating the mixture. The sodium chloride has the effect of salting out or gelling the sodium lignosulfonate dispersing agent, producing a stable cream colored gelatinous paste, which does not settle and can be stored for long periods of time. The proportion of salt added is advantageously about 5 to 10% based on the total weight of the mixture. Other salts, such as KCL, $Na_2SO_4$ or $Na_3PO_4$, may be substituted for sodium chloride. Preferably, the salt should be one which does not form a water-insoluble compound with the dispersing agent, and, desirably, does not form water insoluble soaps.

The proportions of water may be varied widely but for best results the reaction mixture should contain about 40 to 50% of water, based on the weight of the mixture. While the particle size of the granular suspension is being reduced the proportion of water is desirably within the range of about 40 to 55%, and the final paste preferably contains about 30 to 50% of water, 40 to 50% water yielding the optimum results.

The proportions of the water-insoluble inhibitor are also variable. During the ball milling step I prefer to have present about 35 to 45% of this material, while its concentration in the final paste desirably ranges from about 30 to 40%, based on the weight of the whole mixture.

In the preferred method, the amount of dispersing agent present during reaction is about 3 to 5%, based on the weight of the mixture, and the amount present during the ball-milling step is about 8 to 10%. In the final paste about 7 to 9% of dispersing agent is preferably present.

The pastes of this invention may be added directly to aqueous dyebaths and disperse easily therein. They are particularly suitable for use with dyebaths containing those blue anthraquinone dyestuffs which are susceptible to acid fading on cellulose acetate. The pastse of this invention may also be added to water containing a dispersing agent to produce a padding bath which may be applied directly to the textile material before or after dyeing.

In order further to illustrate my invention, but without being limited thereto, the following examples are given.

Example I

A solution of 6 parts by weight of sodium lignosulfonate "Marasperse N" in 55 parts by weight of water at a temperature of 60° C. is placed in a reactor equipped with an efficient agitator and baffles. To the agitated solution there are added 40 parts by weight of N,N'-diphenylethylenediamine, which melts and disperses to some extent. The reactor is then closed and 15.5 parts by weight of 40% formalin, which furnishes a 10% excess over the amount of formaldehyde theoretically necessary for the reaction, are added gradually, with agitation, over a one hour period. The reaction is mildly exothermic and the temperature is permitted to rise to 80° C. during the formaldehyde addition. The reaction is completed by maintaining the mixture, with agitation, for three more hours at 80° C. To effect the removal of excess formaldehyde 0.66 parts by weight of caustic soda are added to the reaction mixture which is maintained at a temperature of 80° C. In approximately two hours the odor of formaldehyde has disappeared, whereupon an additional 6 parts by weight of sodium lignosulfonate are added and the excess caustic soda is neutralized by the addition of about 0.8 pound of acetic acid to bring the pH of the mixture to 6.8 to 7.0. The resulting granular suspension of 1,3 diphenylimidazolidine is then ball-milled until the material no longer has a gritty feel, an operation which takes about four hours. At this stage the suspension has a content of about 40% of 1,3-diphenylimidazolidine, which is present in the form of dispersed particles, whose size ranges from about 1 to 40 microns. Water is added to reduce the 1,3-diphenylimidazolidine content of the suspension to 35% and 10 parts by weight of sodium chloride are then mixed into the suspension. After a few minutes the salt dissolves and gelation occurs but agitation is continued for 15 minutes after the addition of the salt. The final product is a stable, cream colored, gelatinous paste which does not settle and can be stored for long periods of time.

Example II 5 parts by weight of water, preferably hot, are added with agitation to 1 part by weight of the gelatinous paste of Example I. The paste disperses readily in the water. The resulting mixture is stirred into 2450 parts by weight of a dyebath containing, for each liter of dyebath, 29 mg. of the blue dye, 1-(2-hydroxyethylamino)-4-methyl amino anthraquinone, 4 ml. of Turkey red oil, 2 ml. of a 10% aqueous solution of green soap and 1 ml. of a 50% aqueous solution of potassium pyrophosphate. 35 parts by weight of cellulose acetate fabric are dyed with this dyebath at 80° C. for 1 hour and rinsed with distilled water. The fabric is colored a blue shade which is resistant to acid fading.

It is to be understood that the foregoing detailed description is given merely by way of illustration and that many variations may be made therein without departing from the spirit of my invention.

Having described my invention what I desire to secure by Letters Patent is:

1. Process for the production of a 1,3-diazacyclo compound of the formula

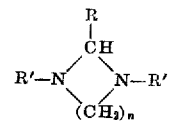

wherein R is a member of the group consisting of hydrogen, alkyl, aryl and substituted aryl groups, R' is a member of the group consisting of cycloalkyl, alkaryl, aryl and substituted aryl groups and n is an integer of at least 2, which comprises agitating a mixture of a polymethylene diamine of the formula

water, a lignosulfonic dispersing agent and an aldehyde of the formula R—CHO to produce a granular dispersion of said 1,3-diazacyclo compound, then comminuting said compound in said dispersion and effecting gelation of said dispersion by the addition of a water-soluble inorganic salt which does not form a water-insoluble compound with said lignosulfonic dispersing agent.

2. Process for the production of 1,3-diphenylimidazolidine, which comprises reacting with agitation N,N'-diphenyl ethylene diamine with formaldehyde in an aqueous medium in the presence of a lignosulfonic dispersing agent in amount insufficient to produce a stable colloidal dispersion under the reaction conditions to produce a granular dispersion of 1,3-diphenylimidazolidine, comminuting said 1,3-diphenylimidazolidine in said dispersion and effecting gelation of said dispersion by the addition of a water-soluble inorganic salt which does not form a water-insoluble compound with said lignosulfonic dispersing agent.

3. Process for the production of 1,3-diphenylimidazolidine, which comprises reacting with agitation N,N'-diphenyl ethylene diamine with formaldehyde in an aqueous medium in the presence of sodium lignosulfonate in amount insufficient to produce a stable colloidal dispersion under the reaction conditions to produce a granular dispersion of 1,3-diphenylimidazolidine, comminuting said 1,3-diphenylimidazolidine in said dispersion and adding sodium chloride to effect gelation of said dispersion.

4. Process for the production of a gelatinous dispersion of 1,3-diphenylimidazolidine, which comprises producing a liquid aqueous dispersion comprising 1,3-diphenylimidazolidine and sodium lignosulfonate by reacting with agitation N,N'-diphenyl ethylene diamine with excess formaldehyde in an aqueous medium in the presence of sodium lignosulfonate at a temperature of 75° C. to 85° C., decomposing the excess formaldehyde by heating in the presence of a strong base and neutralizing the base, and adding a water-soluble inorganic salt in amount sufficient to effect gelation of said liquid aqueous dispersion.

5. Process for the production of a gelatinous dispersion of 1,3-diphenylimidazolidine, which comprises adding excess aqueous formaldehyde gradually to an agitated mixture of water, sodium lignosulfonate and N,N'-diphenylenediamine maintained above the melting point of the latter, the amount of sodium lignosulfonate in the mixture being insufficient to produce a stable colloidal dispersion under the reaction conditions, continuing the reaction with agitation at a temperature of about 75 to 85° C. until the reaction is substantially complete, adding caustic soda and heating to eliminate excess formaldehyde, adding more sodium lignosulfonate and neutralizing the excess sodium hydroxide, ball milling the resulting granular suspension until it no longer has a gritty feel and adding sodium chloride with agitation to cause gelation.

6. A stable pasty dispersion of a water-insoluble solid 1,3-diazacyclo compound of the formula

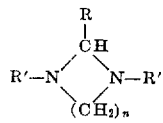

wherein R is a member of the group consisting of hydrogen, alkyl, aryl and substituted aryl groups, R' is a member of the group consisting of cycloalkyl, alkaryl, aryl and substituted aryl groups and n is an integer of at least 2, in an aqueous gelatinized lignosulfonic dispersing agent.

7. A stable pasty dispersion of a water-insoluble solid 1,3-diazacyclo compound of the formula

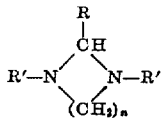

wherein R is a member of the group consisting of hydrogen, alkyl, aryl and substituted aryl groups, R' is a member of the group consisting of cycloalkyl, alkaryl, aryl and substituted aryl groups and n is an integer of at least 2, in aqueous gelatinized sodium lignosulfonate.

8. A stable pasty dispersion of 1,3-diphenylimidazolidine in an aqueous gelatinized lignosulfonic dispersing agent.

9. A stable pasty dispersion of 1,3-diphenylimidazolidine in aqueous gelatinized sodium lignosulfonate.

10. A stable pasty dispersion of 1,3-diphenylimidazolidine in a lignosulfonic dispersing agent which has been gelatinized by the addition of a water-soluble inorganic salt to a smooth liquid aqueous suspension of said diphenylimidazolidine containing a lignosulfonic dispersing agent, said salt being one which does not form a water-insoluble compound with said dispersing agent.

11. Process for the production of dyebaths which comprises mixing the pasty dispersion of claim 8 with an aqueous dyebath.

12. A stable pasty dispersion of 1,3-diphenylimidazolidine in aqueous gelatinized sodium lignosulfonate which has been gelatinized by the addition of a gelatinizing amount of sodium chloride to a smooth liquid aqueous suspension of said diphenylimidazolidine containing sodium lignosulfonate.

13. Process for the production of dyebaths which comprises mixing the pasty dispersion of claim 6 with an aqueous dyebath.

References Cited in the file of this patent

UNITED STATES PATENTS

| | | |
|---|---|---|
| 1,885,509 | Byers | Nov. 1, 1932 |
| 2,008,902 | Ellis | July 23, 1935 |
| 2,447,394 | Candee | Aug. 17, 1948 |
| 2,454,266 | Armatys | Nov. 23, 1948 |
| 2,467,708 | Sturgis | Apr. 19, 1949 |
| 2,518,393 | Smith | Aug. 8, 1950 |
| 2,525,855 | Bergmann | Oct. 17, 1950 |
| 2,525,898 | Grimmel | Oct. 17, 1950 |
| 2,535,747 | Morey | Dec. 26, 1950 |
| 2,550,211 | Watters et al. | Apr. 24, 1951 |
| 2,567,130 | Smith | Sept. 4, 1951 |

FOREIGN PATENTS

| | | |
|---|---|---|
| 664,204 | Great Britain | Jan. 2, 1952 |